US008724458B2

(12) United States Patent
Sachs et al.

(10) Patent No.: US 8,724,458 B2
(45) Date of Patent: May 13, 2014

(54) METHODS AND DEVICES FOR CONTROLLING DATA UNIT HANDLING

(75) Inventors: Joachim Sachs, Aachen (DE); Reiner Ludwig, Hürtgenwald (DE); Henning Wiemann, Aachen (DE); Michael Meyer, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1033 days.

(21) Appl. No.: 10/597,126

(22) PCT Filed: Jan. 14, 2004

(86) PCT No.: PCT/EP2004/000205
§ 371 (c)(1),
(2), (4) Date: Jul. 12, 2006

(87) PCT Pub. No.: WO2005/069554
PCT Pub. Date: Jul. 28, 2008

(65) Prior Publication Data
US 2007/0064716 A1    Mar. 22, 2007

(51) Int. Cl.
*G01R 31/08* (2006.01)
(52) U.S. Cl.
USPC .......................................... 370/230
(58) Field of Classification Search
USPC ................... 370/230, 229, 231, 235
See application file for complete search history.

(56) References Cited

U.S. PATENT DOCUMENTS

| | | | |
|---|---|---|---|
| 5,633,859 A * | 5/1997 | Jain et al. ...................... | 370/234 |
| 6,044,079 A | 3/2000 | Calvignac et al. | |
| 6,625,118 B1 * | 9/2003 | Hadi Salim et al. .......... | 370/229 |
| 6,741,555 B1 * | 5/2004 | Li et al. .......................... | 370/229 |
| 6,822,955 B1 * | 11/2004 | Brothers et al. ............... | 370/389 |
| 6,922,390 B1 * | 7/2005 | Chapman et al. ............. | 370/229 |
| 7,006,440 B2 * | 2/2006 | Agrawal et al. ............... | 370/235 |
| 7,359,321 B1 * | 4/2008 | Sindhu et al. .................. | 370/230 |
| 2002/0136163 A1 * | 9/2002 | Kawakami et al. ............ | 370/229 |
| 2003/0112756 A1 | 6/2003 | Le Gouriellec et al. | |
| 2004/0093453 A1 * | 5/2004 | Lym et al. ...................... | 710/305 |
| 2004/0218617 A1 | 11/2004 | Sagfors | |
| 2005/0002412 A1 | 1/2005 | Sagfors et al. | |
| 2007/0286070 A1 * | 12/2007 | Schliwa-Bertling et al. . | 370/229 |

FOREIGN PATENT DOCUMENTS

| | | |
|---|---|---|
| EP | 0955749 A1 * | 11/1999 |
| EP | 1 249 972 A1 | 10/2002 |

OTHER PUBLICATIONS

Clark D D et al: "Explicit Allocation of Best-Effort Packet Delivery Service" IEEE / ACM Transactions on Networking, IEEE Inc. New York, US, vol. 6, No. 4, Aug. 1, 1998, pp. 362-373, XP000771971 ISSN: 1063-6692 figure 1 p. 363, col. 2, line 2-line 6 p. 363, col. 2. line 31-line 33 p. 367, col. 1, line 4-line 13 p. 370, col. 2, paragraph D.

* cited by examiner

*Primary Examiner* — Mark Rinehart
*Assistant Examiner* — Mohammad Anwar

(57) ABSTRACT

It is proposed to modify data unit handling on the side of a sender (e.g. a sending end-point or a proxy) by introducing congestion notification prevention information into data units, such that a queue buffer that implements a procedure for performing congestion notification with respect to one or more queued data units (e.g. dropping and/or marking data units with explicit congestion information) is capable of preventing the performance of a congestion notification at least with respect to the data units containing the congestion notification prevention information.

23 Claims, 8 Drawing Sheets

METHODS AND DEVICES FOR CONTROLLING DATA UNIT HANDLING

FIELD OF THE INVENTION

The present invention relates to methods and devices for controlling data unit handling, especially for controlling a queue buffer and a data unit sender.

BACKGROUND OF THE INVENTION

In data unit based communication, i.e. in which an information to be transmitted is divided into a plurality of units, and the individual units are sent over a communication network, it is known to provide queue buffers at links along the network, such that data units transported over such a link may be buffered. The buffer may be a sending or output buffer (i.e. a buffer for data units that are to be sent over the outgoing link) or a receiving or input buffer (i.e. a buffer for data units that have been sent over the incoming link).

Such units for transporting data may carry a variety of names, such as protocol data units, frames, packets, segments, cells, etc., depending on the specific context, the specific protocol used and certain other conventions. In the context of the present document, all such units of data shall generically be referred to as data units.

The procedures for placing data units into a queue, advancing them in the queue, and removing data units from the queue are referred to as queue management or queue control.

Many concepts of queue management are known, including such concepts in which a queue length parameter (e.g. the absolute length of queue or an average length) is monitored and compared with a length threshold value, in order to perform a congestion notification procedure if the threshold value is exceeded. Such a congestion notification procedure can consist in dropping a data unit and/or in marking data units (e.g. setting a congestion notification flag in data units). Various examples for such management concepts, like drop-on-full or random early detection (RED) are described in the introduction of EP-A-1 249 972. As a consequence, a repetition is not necessary here.

EP-A-1 249 972 proposes a scheme in which the length threshold value that is to be compared with the queue length parameter is automatically updated on the basis of one or more characteristics of the link over which the queued data units are to be sent. By adapting the automatic threshold to one or more link characteristics, a very flexible form of active queue management is obtained that may provide improved throughput and reduced delay, especially over links that have time varying characteristics such as wireless links. Thereby data unit handling is improved with respect to systems known before.

OBJECT OF THE INVENTION

It is the object of the present invention to provide improved methods and devices of data unit handling, e.g. of queue buffer management.

SUMMARY OF THE INVENTION

This object is achieved by methods and devices as described in the independent claims of the present application. Advantageous embodiments are described in the dependent claims.

In accordance with the present invention its is proposed to modify the data unit handling on the side of a sender (e.g. a sending end-point or a proxy) by introducing congestion notification prevention information into data units, such that a queue buffer that implements a procedure for performing congestion notification with respect to one or more queued data units (e.g. dropping and/or marking data units with explicit congestion information) is capable of preventing the performance of a congestion notification at least with respect to the data units containing the congestion notification prevention information.

In this way, the sender can signal downstream that certain data units should not experience a congestion notification, which has the potential of improving both the data unit handling at the sender side and at the side of the queue buffer located downstream from the sender, as shall be briefly explained.

Namely, the performing of congestion notifications at a queue buffer has the purpose that a sender is instigated to reduce the load it is placing on the network transporting the data units, thereby hopefully also reducing the actual or expected congestion at the buffer. Examples of congestion notifications are the dropping of data units (which is an indirect way of notifying the sender) or the adding of explicit congestion information (e.g. ECN) to data units, where the receiver of the communication places the information in acknowledgment messages sent to the sender. In response to noticing the loss of a data unit or recognizing the explicit congestion notification information, the sender reduces its load, e.g. reduces its send window or its data rate. As an example, in TCP/IP the well known fast retransmit algorithm divides the congestion window by 2 upon detecting a data unit loss.

However, there are situations in which a congestion notification with respect to data units of a particular flow will be useless or even damaging to the overall performance.

For example, if a flow is coming to its end (i.e. there are only a small number of data units left to be sent, e.g. 3), then a congestion notification is in any case useless and superfluous, as the sender is anyway in the process of reducing the load caused by this particular flow, regardless of any congestion notifications. If the congestion notification comprises dropping a data unit, this is downright damaging in the above mentioned case, because the sender will often only be able to notice the loss through a time-out, which generally means that the successful sending of the final data units of the flow is excessively delayed. Namely, in general the loss of a data unit is noticed by the receipt of a predetermined threshold number (e.g. 3) of duplicate acknowledgment messages, but this mechanism does not work if there are only the threshold number or less of data units left to send, which then only leaves a time-out as a detection mechanism.

Another example of a situation in which a congestion notification is useless and/or damaging, is if the sender is application limited, i.e. the amount of data to send is limited by an application providing the data, such that the actual amount of data being sent is smaller than the amount that the sender's flow control would allow (e.g. the congestion window is larger than the available amount of data to be sent, or the allowed data rate is larger than the actual rate of data being supplied from the application), such that a reduction of the relevant flow control parameter (e.g. the congestion window or the allowed send rate) does not lead to any changes in the amount of data actually being sent into the transporting network.

In situations of the above described kind, a data unit sender of the invention is operated to detect a congestion notification prevention condition in a given flow, and if such a condition is detected, setting predetermined congestion notification information in one or more data units of the flow, and a data unit buffer, in which congestion notification operations are performed, is operated to detect this information and to prevent congestion notifications at least for the data units carrying such information, thereby avoiding the above described useless and/or damaging effects.

Examples of the congestion notification prevention condition are the above described situations in which there are only a few data units left to be sent or in which the sender is application limited. Another example is if individual data units are carrying predetermined signalling identifiers. However, the congestion notification prevention condition can be chosen in any suitable or desirable way. It will generally be a condition in which the sending capacity of a data unit sender is limited by one or more factors in such a way that the detection of a direct or indirect congestion notification will not have any effect on the behaviour of the sender, and/or will have an undesirable or damaging consequence on the sender's behaviour.

BRIEF DESCRIPTION OF DRAWINGS

Further aspects and details of the present invention will become apparent from the following detailed description of preferred embodiments, where reference will be made to the accompanying figures in which.

DETAILED DESCRIPTION OF THE EMBODIMENTS

Although the following preferred embodiments of the present invention will often refer to systems using window-based flow control, and more specifically to systems transporting IP (Internet Protocol) data units, the present invention is neither restricted to window-based flow control nor to IP based systems. The present invention can be applied to the handling of any type of data unit, regardless of the specific protocol, and can be applied to any type of flow control, e.g. also to rate-based flow control, as long as the overall system provides for congestion notification procedures to be performed in one or more queue buffers.

Figure 1A:
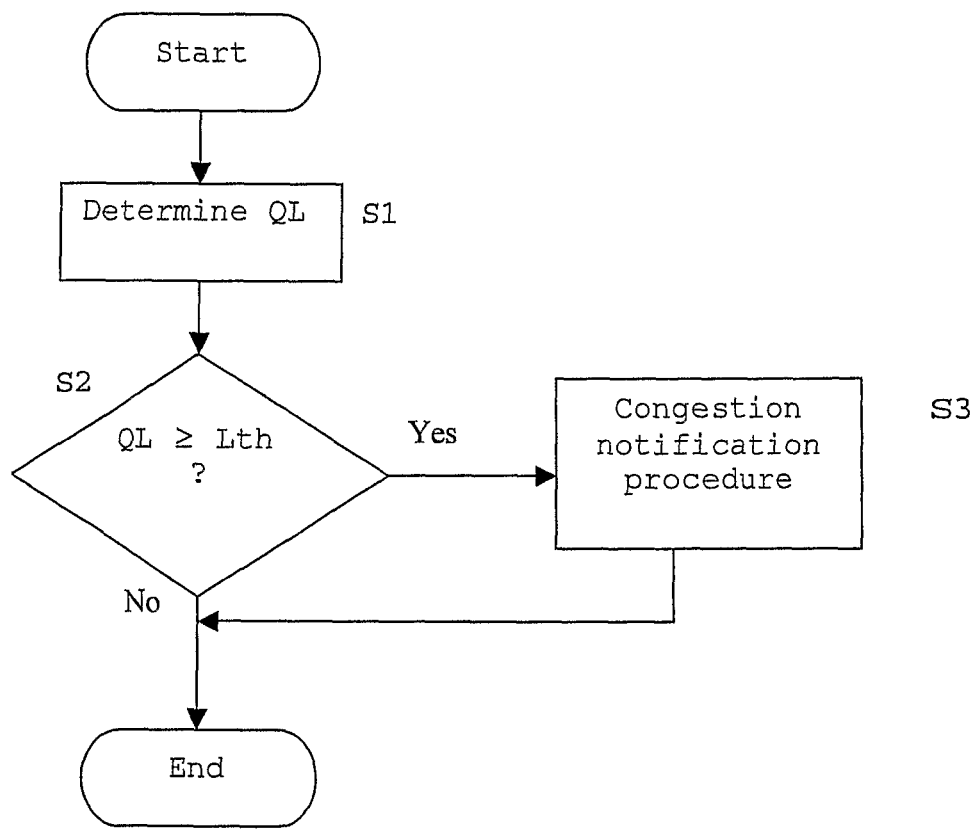
FIG. 1a-1d show a flow charts of method embodiments of the present invention as performed in controlling a queue buffer.

FIG. 1a shows a flow chart of a method to which the present invention can be applied, which method can be performed in a queue buffer arranged to queue data units received over a communication network. In first step S1, a value of a length parameter related to the length of the queue is determined. This queue length related parameter can be related to the queue length in any desirable or suitable way, e.g. can be the actual or momentary queue length QL or a parameter derived from the actual or momentary queue length, such as an average value QLav.

In the example of FIG. 1a, the queue length related parameter is the actual queue length QL. If it is desirable to use an average queue length Qlav, this average value can be determined in accordance with any known suitable averaging algorithm, and such an algorithm may typically consist in updating an old average value by calculating the sum of the old average multiplied by a first weight factor and the momentary queue length multiplied by a second weight factor. For example, QLav can be calculated as $$QLav(new) = QLav(old) \times (1 - \tfrac{1}{2}^n) + (QL \times \tfrac{1}{2}^n)$$

where QL represents the momentary queue length value and n is an exponential weight factor adjustable between 0 and 1.

Returning to FIG. 1a, the queue length parameter QL is compared with a length threshold value Lth in step S2. If the length threshold value Lth is exceeded, then a congestion notification procedure S3 is performed, otherwise the congestion notification procedure S3 is skipped.

Although the congestion notification procedure S3 is invoked on the basis of a threshold comparison in the example of FIG. 1a, the present invention is applicable in the context of any system that has a congestion notification procedure, even if it is invoked on the basis of supplementary or alternative conditions.

Figure 1B:
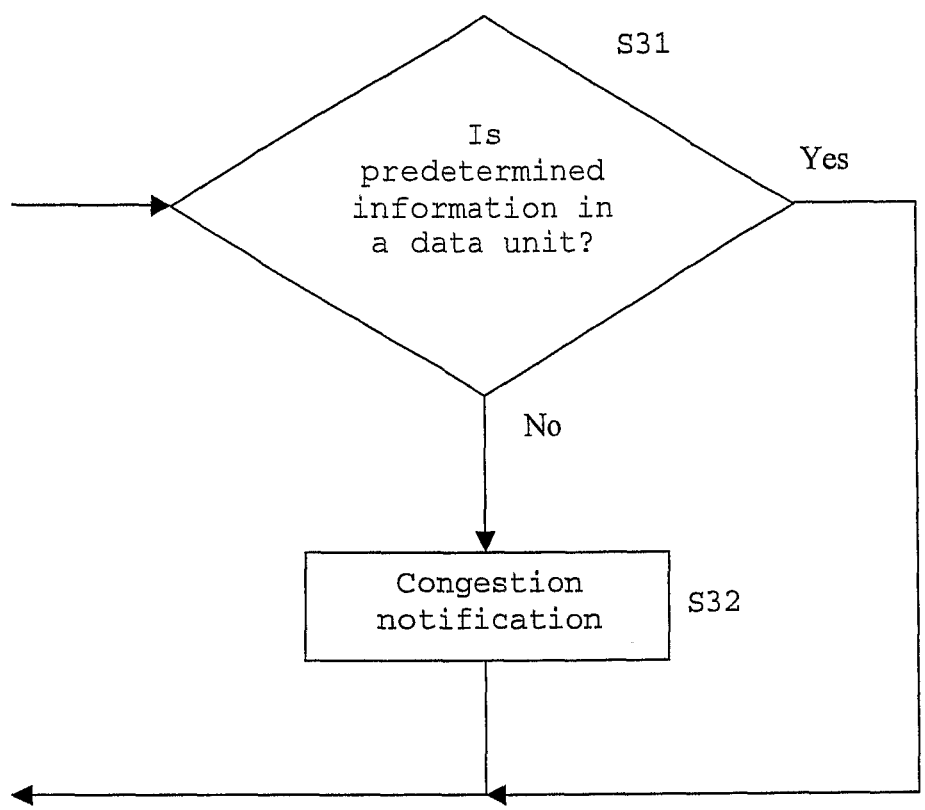

FIG. 1b shows an inventive embodiment of step S3. In accordance with the present invention, the congestion notification procedure S3 comprises a step S31 in which it is determined whether one or more of the queued data units contains predetermined information (the congestion notification prevention information added upstream, as shall be explained in more detail further on). If this is not the case, the procedure goes to step S32, in which a congestion notification is performed with respect to one or more queued data units. However, if the outcome of step S31 is such that one or more queued data units comprise the predetermined information, then the execution of step S32 is prevented.

The congestion notification S32 can basically be chosen in any suitable or desirable way. For example, it can comprise the dropping/marking of one or more predetermined or one or more randomly selected data units from the queue 21, or the dropping/marking of one or more newly arrived data units before placing them into the buffer queue, or the performing of such a dropping/marking operation in dependence on a predetermined probability function. The marking can e.g. be achieved by setting an explicit congestion notification flag in one or more of the queued data units. The actual performance of the congestion notification can also be conditional on further requirements, e.g. a probability function, as known from RED (Random Early Detection).

As already mentioned, the present invention can be applied in the context of any system that invokes a congestion notification procedure. However, it is preferred to apply the invention in a system as shown in FIG. 1a, i.e. in which a value indicative of the queue length is compared with a length threshold value, and a congestion notification procedure is invoked if the threshold is exceeded. The method shown in the example of FIG. 1a may be applied to any known queue management scheme of this kind in which a queue length related parameter is compared to at least one length threshold value, and where a congestion notification procedure is conducted if the threshold is exceeded. Namely, the method is e.g. applicable to any known RED scheme, to schemes that drop data units when a queue is full, such as tail-drop, random-drop or front-drop, and to any known scheme that perform explicit congestion notification instead of or in addition to dropping. It is in fact preferable to apply the method and device of the present invention in connection with an active queue management scheme, preferably the active queue management as disclosed in EP-A-1 249 972. The entire disclosure of this document and its US counter-part application, are herewith incorporated by reference.

In the example of FIG. 1b performance of congestion notification with respect to any queued data units is prevented if there are one or more data units in the queue that contain the predetermined information.

The queue in which data units are held can be such that it only contains data units from one flow. A flow is generically identified by a source and destination host address, the source and destination Service Access Point (SAP) identifier and a protocol identifier. The definition and concept of a flow is well known in the art, e.g. from TCP/IP, in which case the SAP identifiers are referred to as port numbers, and the source and destination host addresses are called IP addresses, such that a further explanation is not necessary here.

If the queue only contains data units from one flow, then the example of FIG. 1b means that as long as data units of said flow carry the predetermined congestion notification prevention information, no data units from said flow experience a congestion notification, i.e. are not dropped or marked.

The example of FIG. 1b can also be applied if the queue holds data units from a plurality of flows. Namely, as soon as there are data units in the queue that carry the predetermined information, no data units experience a congestion notification. Such a scheme is especially advantageous if the predetermined information is associated with a flow that is approaching its end. Namely, in this case the presence of data units with information implies that one or more flows in the queue are coming to an end, which in turn means that resources presently used by said flows coming to an end will soon become available for other flows. It would therefore be disadvantageous to perform a congestion notification for said other flows, because this would force the senders of said flows to reduce their load, although resources are just about to become available.

Figure 1C:
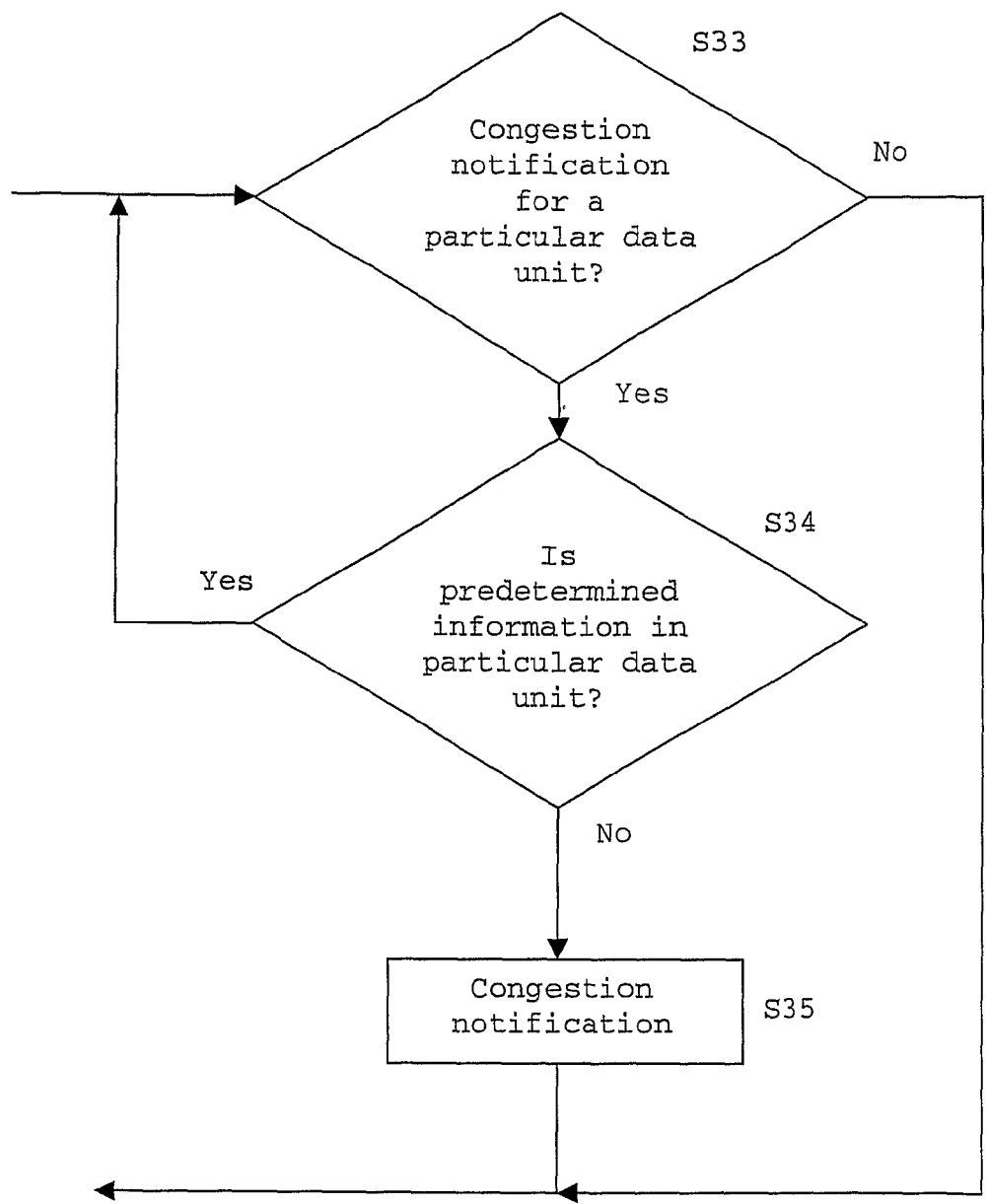

FIG. 1c shows another inventive embodiment of step S3. In the example of FIG. 1c the congestion notification procedure begins with step S33 in which it is determined whether a congestion notification is to be performed with respect to a particular data unit. The selection of a particular data unit can be done in any known way, e.g. random selection, selection of the first data unit in the queue or of the last data unit in the queue, and the determination of whether a congestion notification is to be performed or not can also be done in any desired way, e.g. be based on a probability function as known from RED. The method of FIG. 1c goes to step S34 if the outcome of S33 indicates that a congestion notification should be performed for the particular data unit. In step S34 it is determined whether the particular data unit comprises the predetermined information, and if it does not, the congestion notification is actually performed in step S35. On the other hand, if the particular data unit comprises the predetermined information, a congestion notification is prevented. However, in the example of FIG. 1c, the procedure then loops back to S33, in order to allow the selection of another data unit for congestion notification.

Therefore, the embodiment of FIG. 1c is an example of the general concept of preventing the performance of congestion notification for data units carrying the predetermined information, but allowing congestion notifications for other data units.

Figure 1D:
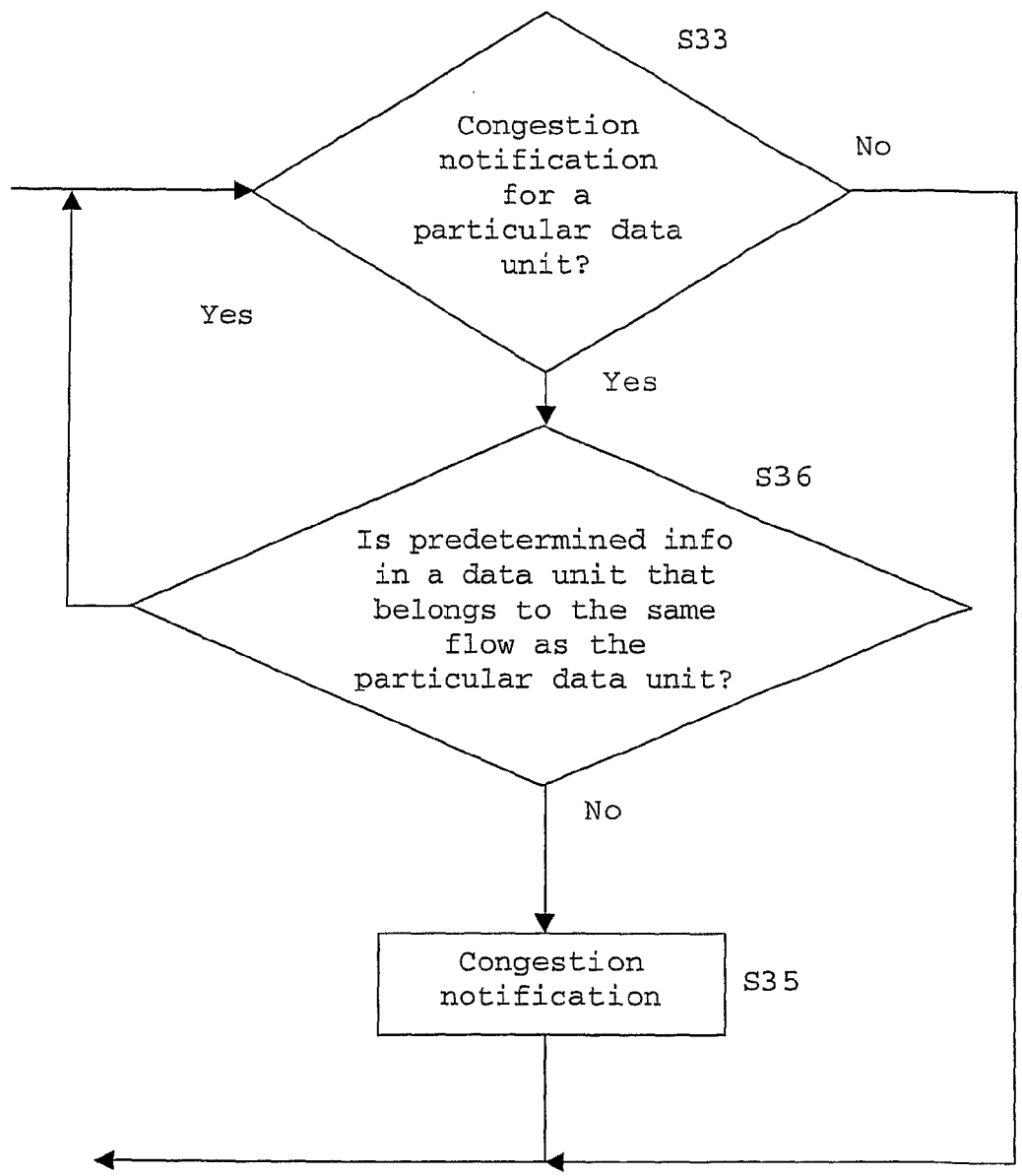

According to another embodiment, the performance of congestion notification can also be prevented for all data units that belong to the same flow as a data unit containing the predetermined information. This is shown in the example of FIG. 1d, which has the same steps S33 and S35 as the embodiment of FIG. 1c, such that a repeated description is not nec-essary, but in which step S34 has been replaced by step S36. In step S36 it is determined whether the predetermined information is in a data unit that belongs to the same flow as the particular data unit selected in step S33. If so, no congestion notification is performed. The overall effect is to prevent congestion notification in flows in which at least some data units carry the predetermined information. This is helpful in instances in which e.g. a certain number of data units from a flow are at the head of a queue, and data units at the end of the queue from the same flow carry the predetermined information, e.g. indicate that the flow is coming to an end.

In order to implement the embodiment of FIG. 1d, the buffer control is able to distinguish between different flows. This can be done by analysing the flow information in the data units, namely the SAP identifier and protocol identifier typically contained in the data unit header.

In the above described embodiments, it was always assumed that the congestion notification procedure is such that the preventing of a congestion notification does not lead to problems. This will typically be the case in all systems where congestion notifications are performed before serious congestion occurs, e.g. in RED systems or systems as described in EP-A-1 249 972. If there are situations in which it is absolutely necessary to perform a congestion notification, e.g. to drop data units because an absolute buffer limit is being exceeded, additional steps can be added, e.g. a step at the beginning or end of the procedures shown in FIG. 1b to 1d that asks whether such a situation is occurring, and if this is the case, unconditionally performs a default dropping operation.

Figure 3:
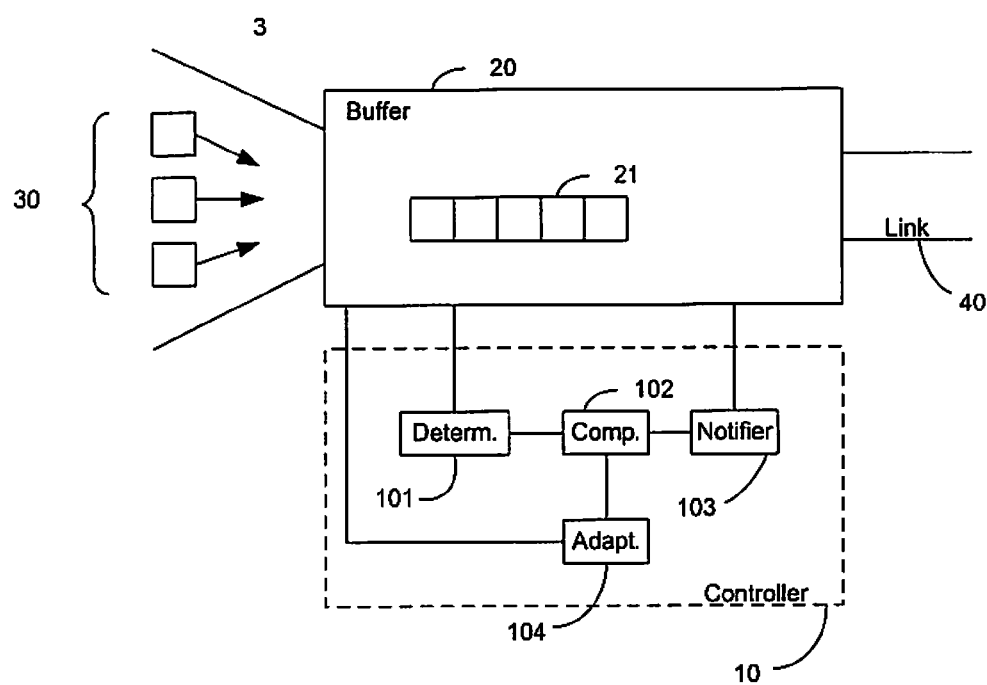
FIG. 3 shows a schematic block diagram representation of a buffer and buffer controller according to an embodiment of the invention.

FIG. 3 shows a schematic representation of a queue buffer controller 10 that is capable of implementing the above described embodiments for controlling the management of data units in a queue buffer 20. Reference numeral 3 represents a communication network over which data units 30 arrive at the queue buffer 20, in order to be placed in a queue 21 before being sent over link 40. Queue 21 can be arranged in such a way that all of the data units in said queue 21 are from the same flow, or they may be from a plurality of flows. It is possible that buffer 20 is managed in such a way that there are a plurality of queues, each queue being associated with a corresponding flow.

In accordance with the present invention, the queue buffer controller 10 comprises a congestion notifier 103 for invoking a congestion notification procedure under a predetermined condition, where the congestion notifier 103 comprises a part 1031 for determining whether one or more of said queued data units contains a predetermined information, and if no queued data units contain said predetermined information, for performing a congestion notification with respect to one or more queued data units, and if one or more queued data units contain said predetermined information, for preventing a performance of a congestion notification at least with respect to said data units containing said predetermined information.

The congestion notifier 103 is arranged to implement the methods described in connection with FIGS. 1b-1d. For example, the part 1031 may be arranged to prevent performance of congestion notification with respect to any queued data units if one or more queued data units contain said predetermined information, or the part 1031 may be arranged to prevent performance of congestion notification with respect to all data units belonging to a same flow as said data units containing said predetermined information if one or more queued data units contain said predetermined information.

Reference numeral 101 describes a queue length determinator for determining a value of a length parameter related to the length of queue 21. Furthermore, a comparator 102 is provided for comparing the determined length value with a length threshold value provided by a threshold adaptor 104, which is arranged to automatically adapt the length threshold values. The automatic threshold adaptation preferably occurs in accordance with the teachings of EP-A-1 249 972. The comparator 102 is connected to a congestion notifier 103 that performs a congestion notification procedure if the determined length value is greater than the length threshold value. As already explained, the length parameter to be determined can be chosen in any suitable or desirable way, e.g. be the absolute length queue length or an average queue length, and the congestion notification procedure can equally be chosen as is suitable or desirable, e.g. may comprise data unit dropping and/or explicit data unit marking.

The controller 10 and buffer 20 shown in FIG. 3 will generally be provided within a network node of communication network 3. Such a communication node can e.g. be a server and/or a router in network 3.

It is noted that the above-described elements 101-104 can be provided as hardware, software or any suitable combination of hardware and software. Preferably, the controller 10 is a programmable data processor, and the elements 101 to 104 are software elements, e.g. program code parts.

Figure 2:
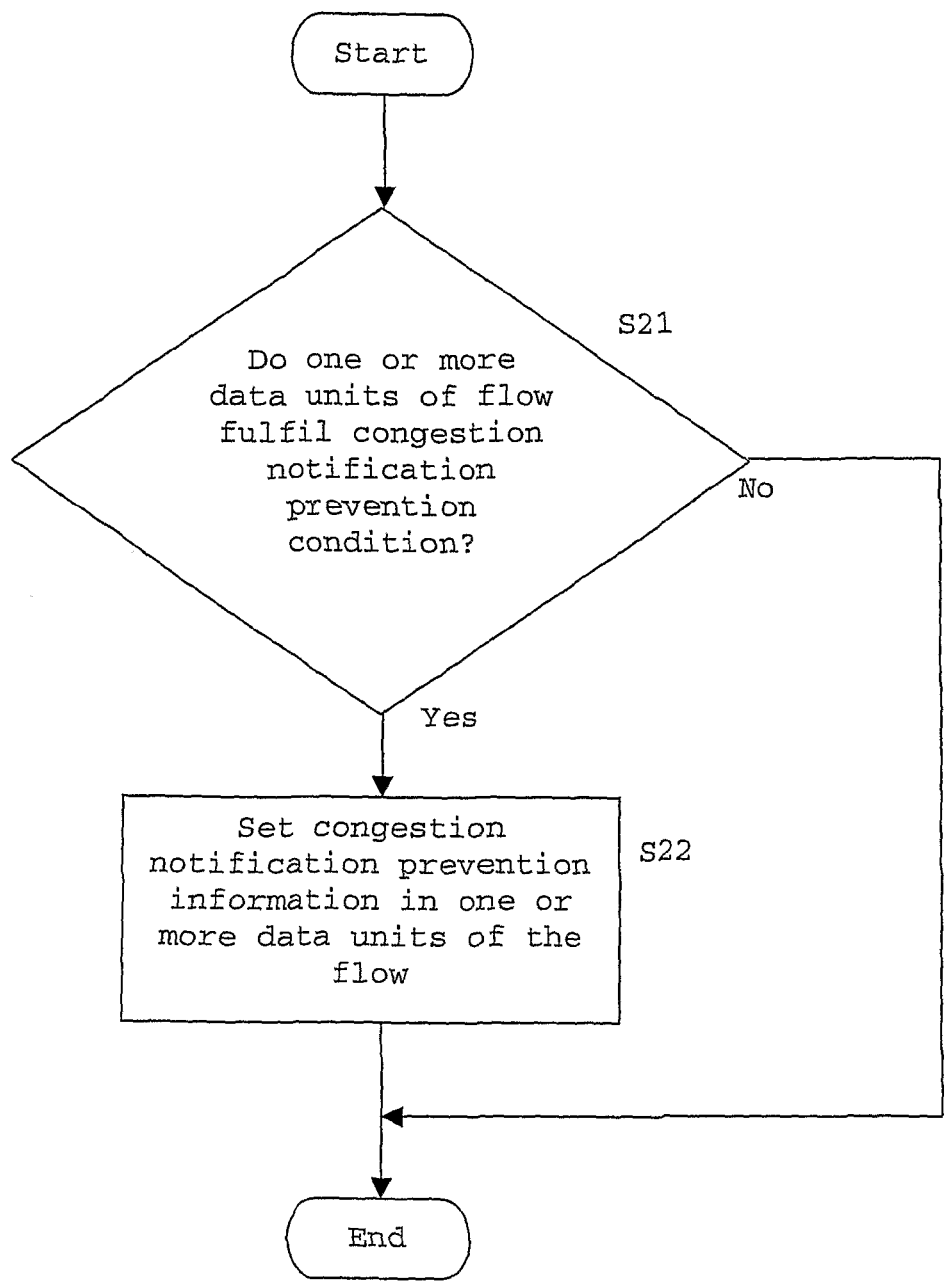
FIG. 2 shows a flow chart of a method embodiment of the present invention as performed at a data unit sender.

FIG. 2 shows an example of a method embodiment of the invention for implementation in a data unit sender. S21 is a step for determining whether a flow of data units fulfils a congestion notification prevention condition, and if the flow fulfils said congestion notification prevention condition, the procedure goes to step S22 for setting predetermined congestion notification prevention information in one or more data units of said flow. This predetermined congestion notification prevention information can then be used by queue buffer controllers downstream when implementing the methods of FIGS. 1*a*-1*d* in order to prevent congestion notifications.

As already mentioned before, the congestion notification prevention condition may comprise that the flow is coming to an end, or that the flow is application limited. However, the congestion notification prevention condition can be chosen in any suitable or desirable way. For example, it can also be defined by the presence of certain identifiers in the data units to be sent. Taking TCP/IP as an example, there are certain data units that carry signalling information, e.g. a SYN, RST or FIN flag. The presence of such a signalling identifier can also be chosen as a congestion notification prevention condition.

The congestion notification prevention condition will generally be a condition in which the sending capacity of a data unit sender is limited by one or more factors in such a way that the detection of a direct or indirect congestion notification will not have any effect on the behaviour of the sender, and/or will have an undesirable or damaging consequence on the sender's behaviour.

The congestion notification prevention condition can be detected in any suitable or desirable way depending on its exact nature. For example, the condition of application limitation can be detected by observing the amount of data arriving from a higher layer and comparing said amount with the amount allowed by the sender's flow control, e.g. with the allowed send window or the allowed data rate. The difference can be compared to predetermined threshold values, and if a given threshold is exceeded, a condition of application limitation may be judged. The condition that a flow is coming to an end can be detected by observing specific messages from the higher layer (e.g. the application informs the network layer that sending will be terminated), or by observing the amount of data left to be sent in a send buffer. Namely, if the sender observes that there is no more data left to send in a send buffer, it may conclude that the corresponding flow is coming to an end.

As can be seen, the step for determining whether a flow of data units fulfils a congestion notification prevention condition may or may not comprise the analysing of higher layer information. Preferably, it comprises analysing predetermined higher layer information, either contained in the data units being sent, or provided directly from an entity at a higher protocol layer (e.g. the sending application) to the sender.

It is noted that the data unit sender in which the method of FIG. 2 is applied may be an end-point of a communication, e.g. a terminal, or can be an intermediate entity, such as a proxy server. A proxy is an entity that communicates at the same protocol level as two communication end-points, but is located between the end-points and relays the data units sent between the end-points. The proxy may or may not be transparent to the end-points. As the concept of proxy server is well known in the art, a further explanation is not necessary here.

Figure 4:
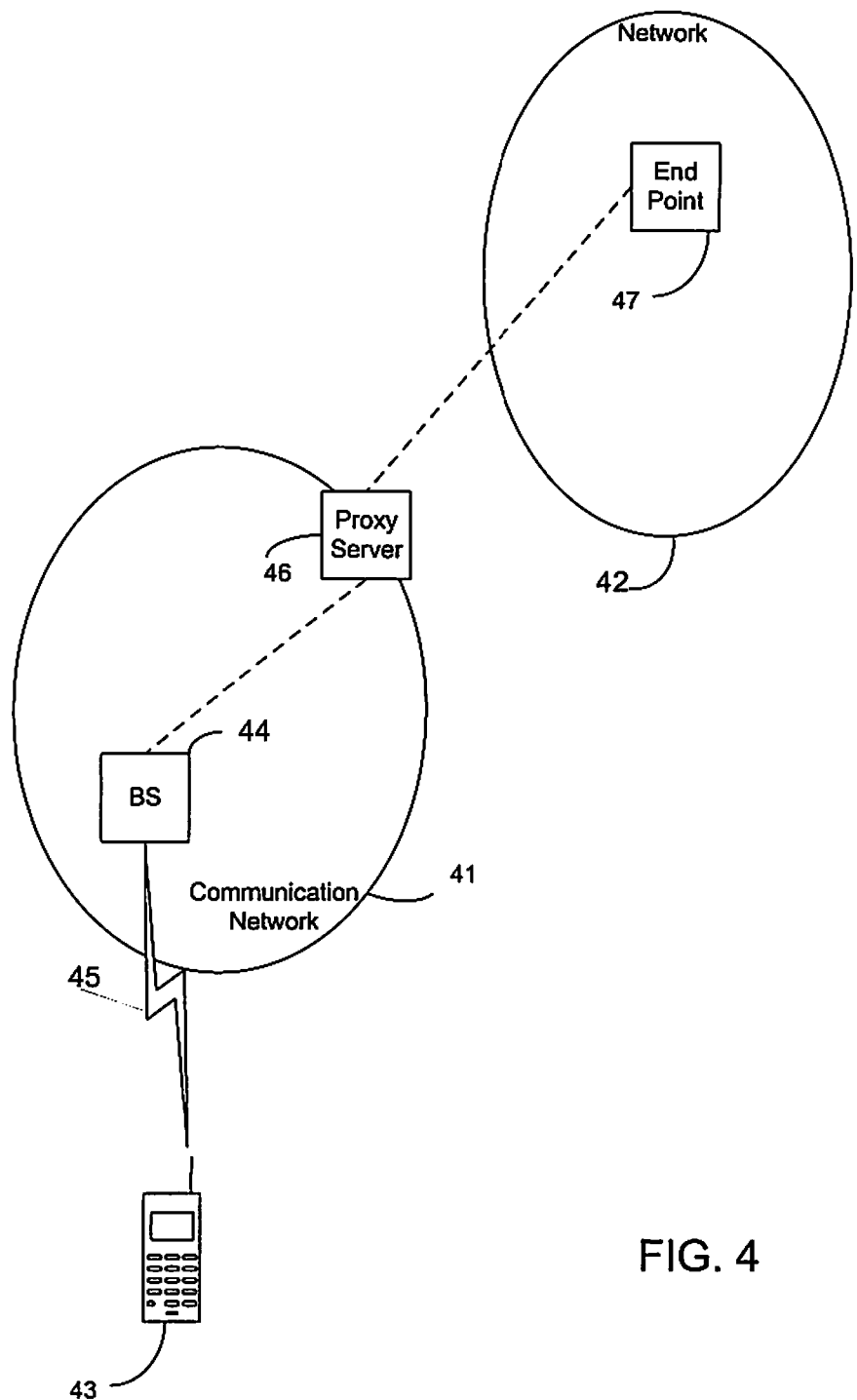
FIG. 4 shows a schematic block diagram representation of an embodiment of the invention involving a proxy server.

An example of a proxy server is shown in FIG. 4. A proxy server 46 is connected to a first communication network 41, e.g. a mobile communication network, and arranged for receiving data units from a sending end-point 47 outside of the first communication network 41 and for relaying the data units to a receiving end-point 43 connected to the first communication network 41. In the example, communication network 41 is a mobile communication network, a receiver 43 is a mobile terminal that communicates over an air interface or wireless link 45 with a base station 44. The base station 44 may comprise the buffer 20 and controller 10 described in connection with FIG. 3, where wireless link 45 then corresponds to link 40. Proxy server 46 is located at the edge of the mobile communication network, and serves as a gateway to the other network 42, which can e.g. be the Internet.

Proxy server 46 provides for an adjustment in flow control between networks 41 and 42. Namely, network 42 will generally have a much higher transmission capability (high bandwidth, e.g. Internet back bone) than network 41 (comparatively low bandwidth due to wireless link(s)), so that data will generally pile up at the proxy 46. The proxy therefore has the opportunity to observe the data units arriving from sending end-point 47. For example, the proxy can observe if there are no further data units arriving in a given flow, and can then conclude that the flow is coming to an end. Preferably, the proxy looks for specific information in the arriving data units. For example, in TCP/IP a sender 47 adds a FIN flag into the TCP header to indicate that the connection will be terminated. The proxy 46 then knows that the flow for which it still has data units in its send buffer is coming to an end, and can e.g. appropriately mark the final k data units with the predetermined congestion notification prevention information. k is a positive integer, preferably 3.

Figure 5:
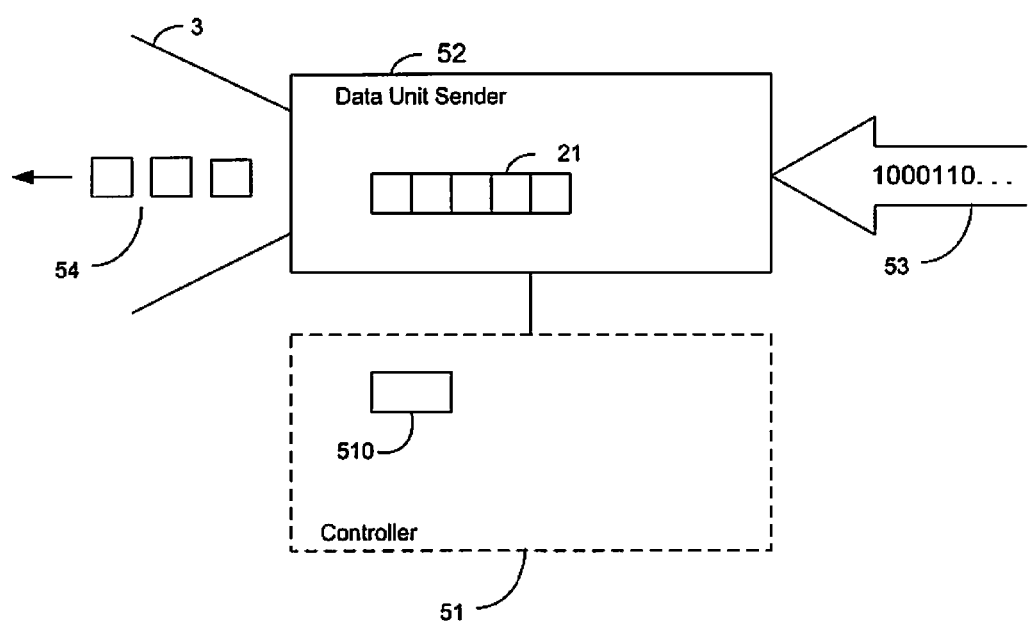
FIG. 5 shows a schematic block diagram representation of a data unit sender and data unit sender controller according to an embodiment of the invention.

FIG. 5 shows a schematic example of a controller for implementing the method of FIG. 2. The controller 51 is arranged for controlling a data unit sender 52 for sending data units 54 over a communication network 3. It comprises an element 510 for determining whether a flow of data units fulfils a congestion notification prevention condition, and if said flow fulfils said congestion notification prevention condition, for setting predetermined congestion notification prevention information in one or more data units of said flow. Element 510 provides all of the functionalities described above in connection with step S21 of FIG. 2. As such, it may or may not be capable analysing higher layer information, but preferably is able to analyse higher layer information in order to determining whether a congestion notification prevention condition is fulfilled.

In FIG. 5, the arriving data is symbolized by a stream 53 of bits. If the data unit sender 52 is a part of an end-point, then the stream comes from a higher layer, e.g. an application, and if the data unit sender 52 is a part of a proxy, then the stream arrives from an end-point, such as entity 47 shown in FIG. 4.

An important advantage of the present invention is the possibility of detecting information (e.g. that a flow is coming to an end) that is already available at the source of the data (i.e. at the terminal or the proxy), but normally would not be available at the entity that performs the queueing, and providing this information to the queueing entity.

The predetermined congestion notification prevention information can be chosen in any suitable or desirable way. It can e.g. be a single bit at a defined location. For example, a certain part of the data unit header can be chosen as the congestion notification prevention bit, where one bit value indicates prevention and the other bit value indicates no prevention.

The congestion notification prevention information can also be more detailed. For example, it may comprise a data unit count-down value that counts down the number of data units remaining in the flow. In other words, the k-to-last data unit e.g. carries the value k in the predefined congestion notification prevention location, the (k−1)-to-last carries the value (k−1), etc. until the last data unit carries a 1 at that location, such that a queue buffer downstream receives more detailed information on the state of the flow.

Although the present invention has been described by way of specific examples, these are not intended to be limiting, as the scope of the invention is defined by the appended claims. Reference signs in the claims only serve to make the claims easier to read and are also not intended to have any limiting effect.

The invention claimed is:

1. A method of controlling a queue buffer arranged to queue data units received over a communication network, comprising:
    invoking a congestion notification procedure under a predetermined condition, wherein said congestion notification procedure comprises:
        determining whether any of a plurality of queued data units contain a predetermined congestion notification prevention information,
        performing a congestion notification with respect to the one or more queued data units if none of the plurality of queued data units contain said predetermined congestion notification prevention information, and
        preventing a performance of a congestion notification at least with respect to:
            one or more of the plurality of queued data units containing said predetermined congestion notification prevention information, and
            one or more of the plurality of queued data units belonging to a same flow as said one or more queued data units containing said predetermined congestion notification prevention information,
        wherein preventing performance of the congestion notification on a data unit includes preventing the data unit from being dropped and preventing the data unit from being or marked with a congestion notification flag.

2. The method of claim 1, wherein said performing of said congestion notification with respect to a given data unit comprises one of dropping said given data unit and marking said given data unit with a congestion notification flag.

3. The method of claim 1, wherein if performance of the congestion notification is prevented, performance of the congestion notification is further prevented with respect to one or more of the plurality of queued data units that belong to another flow.

4. A method of controlling a data unit sender for sending data units over a communication network, comprising:
    determining whether one or more data units of a flow of data units fulfills a congestion notification prevention condition, and
    if said one or more data units of said flow fulfills said congestion notification prevention condition, setting a predetermined congestion notification prevention information in at least said one or more data units of said flow,
    wherein setting the predetermined congestion notification prevention information in the at least one or more data units of the flow prevents the at least one or more data units of the flow from being dropped and from being marked with a congestion notification flag.

5. The method according to claim 4, wherein said step of determining whether a congestion notification prevention condition is fulfilled comprises a step of analyzing higher layer information associated with the flow of data units.

6. The method of claim 4, wherein said congestion notification prevention condition comprises an indication that the flow of data units is coming to an end.

7. The method of claim 4, wherein said congestion notification prevention condition comprises an indication that the flow of data units is application limited.

8. The method of claim 4, wherein said congestion notification prevention condition comprises an indication that said one or more data units of said flow carry predetermined signaling identifiers.

9. The method of claim 4, wherein said data unit sender is part of a proxy server.

10. The method of claim 9, wherein said proxy server is connected to a mobile communication network and arranged for receiving data units from a sending end point outside of said mobile communication network and relaying said data units to a receiving end point connected to said mobile communication network.

11. The method of claim 4, wherein said predetermined congestion notification prevention information is a single bit.

12. The method of claim 4, wherein said predetermined congestion notification prevention information is a data unit count-down value that counts down the number of data units remaining in the flow.

13. A queue buffer controller for controlling a queue buffer arranged to queue data units received over a communication network, comprising:
    a congestion notifier for invoking a congestion notification procedure under a predetermined condition, wherein said congestion notifier comprises
        means for determining whether any of a plurality of queued data units contains a predetermined congestion notification prevention information,
        means for performing a congestion notification with respect to one or more queued data units if none of the plurality of queued data units contain said predetermined congestion notification prevention information, and
        means for preventing a performance of a congestion notification at least with respect to:

one or more of the plurality of queued data units containing said predetermined congestion notification prevention information, and one or more of the plurality of queued data units belonging to the same flow as said one or more queued data units containing said predetermined congestion notification prevention information, wherein preventing performance of the congestion notification on a data unit includes preventing the data unit from being dropped and preventing the data unit from being marked with a congestion notification flag.

14. The queue buffer controller of claim 13, wherein said means for preventing a performance of a congestion notification is arranged to prevent performance of congestion notification with respect to one or more of the plurality of queued data units that belong to another flow.

15. A controller for controlling a data unit sender for ending data units over a communication network, comprising:

an element for determining whether one or more data units of a flow of data units fulfills a congestion notification prevention condition, and if so, the element setting predetermined congestion notification prevention information in at least one or more data units of said flow, wherein setting the predetermined congestion notification prevention information in the at least one or more data units of the flow prevents the at least one or more data units of the flow from being dropped and from being marked with a congestion notification flag.

16. The controller according to claim 15, wherein said element for determining whether a congestion notification prevention condition is fulfilled, further comprises an element for analyzing higher layer information associated with the flow of data units.

17. The controller of claim 15, wherein said congestion notification prevention condition comprises an indication that the flow is coming to an end.

18. The controller of claim 15, wherein said congestion notification prevention condition comprises an indication that said flow is application limited.

19. The controller of claim 15, wherein said congestion notification prevention condition comprises an indication that said one or more data units of said flow carry predetermined signaling identifiers.

20. The controller of claim 15, wherein said data unit sender is part of a proxy server.

21. The controller of claim 20, wherein said proxy server is connected to a mobile communication network and arranged for receiving data units from a sending end point outside of said mobile communication network and relaying said data units to a receiving end point connected to said mobile communication network.

22. The controller of claim 15, wherein said predetermined congestion notification prevention information is a single bit.

23. The controller of claim 15, wherein said predetermined congestion notification prevention information is a data unit count-down value that counts down the number of data units remaining in the flow.

\* \* \* \* \*